3,639,390
AZABICYCLOALKANE DERIVATIVES
Vishwa Prakash Arya, Bombay, India, assignor to
Ciba Limited, Basel, Switzerland
No Drawing. Filed Dec. 19, 1967, Ser. No. 691,705
Claims priority, application Switzerland, Dec. 30, 1966,
18,844/66; Nov. 15, 1967, 15,961/67
Int. Cl. C07d 41/00
U.S. Cl. 260—239 BA         7 Claims

ABSTRACT OF THE DISCLOSURE

Compounds of the formula

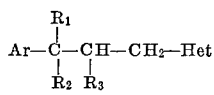

Ar: aromatic carbocyclic radical or monoazacyclic aromatic radical, particularly aryl-lower alkoxy-substituted phenyl;
$R_1$: H, aliphatic or aromatic radical;
$R_2$: H, free or functionally converted carboxyl; or
$R_1+R_2$: oxo group;
$R_3$: aliphatic radical, particularly lower alkyl;
Het: N - azabicycloalkyl, particularly 3 - aza - 3 - bicyclo[3,2,2]nonyl radical;

or salts thereof, have antitussive effects.

SUMMARY OF THE INVENTION

The invention concerns azabicycloalkane compounds of the formula

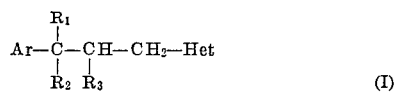     (I)

wherein Ar represents an aromatic radical or a monoazacyclic radical of aromatic character, $R_1$ and $R_2$ together stand for an oxo group, or $R_1$ represents a hydrogen atom, an aliphatic or aromatic radical, and $R_2$ represents a hydrogen, or a free or functionally converted hydroxyl group, $R_3$ stands for an aliphatic radical, and Het represents an N-azabicycloalkyl group, as well as their salts, process for their manufacture and pharmaceutical preparations containing them. The new compounds and pharmaceutical compositions containing them are useful as antitussive agents.

DESCRIPTION OF THE PREFERRED EMBODIMENTS

An aromatic radical is a mono- or bicyclic aromatic radical, such as a naphthyl group, but especially a phenyl group, which groups may be substituted by one, two or more identical or different substituents. Such substituents are, for example, hydrocarbon radicals, such as lower aliphatic radicals, e.g. lower alkyl, such as methyl, ethyl, n-propyl, isopropyl, n-butyl, tert.-butyl or isopentyl, free hydroxy, etherified hydroxy, such as lower alkoxy, e.g. methoxy, ethoxy or propyloxy, lower alkenyloxy, such as allyloxy, aryloxy, e.g. phenyloxy, amino-lower alkoxy or amino-lower alkoxy-lower alkoxy, in which amino stands for a primary, secondary or tertiary amino group, such as a lower alkyl-amino, di-lower alkyl-amino, lower alkyleneamino, oxa-lower alkyleneamino or aza-lower alkyleneamino group, e.g. methylamino, ethylamino, dimethylamino, diethylamino, pyrrolidino, piperidino, morpholino or 4-methyl-piperazino group, such as corresponding aminomethoxy, 2-aminoethoxy or aminomethoxy-methoxy groups, lower alkylenedioxy, such as methylenedioxy, or especially aralkoxy, such as phenyl-lower alkoxy, e.g. benzyloxy, esterified hydroxyl, such as hydroxy esterified with lower aliphatic, for example, lower alkane carboxylic acids, e.g. acetyloxy, or hydroxy esterified by hydrohalic acids, i.e. halogen, e.g. fluorine, chlorine or bromine atoms, trifluoromethyl groups, nitro groups, amino, especially tert. amino groups, such as di-lower alkyl-amino, e.g. dimethylamino or diethylamino.

Aryl, particularly phenyl portions present in a substituent of the aryl residue Ar may also be substituted by groups, such as those mentioned above, especially lower alkyl, lower alkoxy, nitro, amino or trifluoromethyl groups or halogen atoms.

A monoazacyclic radical of aromatic character which may be optionally substituted by one or more of the substituents mentioned before, may be bicyclic, e.g. a quinolyl or isoquinolyl radical, but is, more especially a monocyclic, monoazacyclic residue, such as a pyridyl, e.g. a 2-pyridyl, 3-pyridyl or 4-pyridyl residue.

The groups $R_1$ and $R_2$ together form primarily an oxygen atom. When one of them represents a hydrogen atom or a lower aliphatic, such as a lower alkyl, or an aromatic, such as an optionally substituted phenyl radical, the other may be a hydroxyl group, an etherified hydroxy group, such as a lower alkoxy, e.g. methoxy, ethoxy or propyloxy group, or an esterified hydroxy group, such as a hydroxy group esterified with a lower aliphatic, such as a lower alkane carboxylic acid, e.g. the acetyloxy group, as well as a hydrogen atom.

The group $R_3$ is a lower aliphatic radical, primarily lower alkyl, e.g. methyl, ethyl, n-propyl, isopropyl, n-butyl, t-butyl, n-pentyl or isopentyl.

The N-azabicycloalkyl group Het contains preferably 6–10 carbon atoms as ring or bridge members; a carbon atom of the group Het may be replaced by an optionally substituted (e.g. by a lower alkyl group) nitrogen atom and/or the residue Het may be partly unsaturated and/or substituted e.g. by lower alkyl. Such residues Het are e.g.

3-aza-3-bicyclo[3,2,0]heptyl,
3-aza-3-bicyclo[4,1,0]heptyl,
2-aza-2-bicyclo[2,2,1]heptyl,
6-aza-6-bicyclo[3,1,1]heptyl,
7-aza-7-bicyclo[2,2,1]heptyl,
3-aza-3-bicyclo[3,3,0]octyl,
2-aza-2-bicyclo[2,2,2]octyl or 2-isoquinuclidinyl,
2-aza-2-bicyclo[3,2,1]octyl,
3-aza-3-bicyclo[3,2,1]octyl or 3-norcamphidinyl,
1,8,8-trimethyl-3-aza-3-bicyclo[3,2,1]octyl or 3-camphidinyl,
6-aza-6-bicyclo[3,2,1]octyl,
8-aza-8-bicyclo[3,2,1]octyl or 8-norhydrotropidinyl,
2-aza-2-bicyclo[4,3,0]nonyl,
7-aza-7-bicyclo[4,3,0]nonyl or 4,5,6,7,8,9-hexahydro-1-indolinyl,
8-aza-8-bicyclo[4,3,0]nonyl or 4,5,6,7,8,9-hexahydro-2-isoindolinyl,
3-aza-3-bicyclo[3,3,1]nonyl or 3-isogranataninyl,
3-aza-3-bicyclo[3,2,2]nonyl,
2-aza-2-bicyclo[4,4,0]decyl or 1,2,3,4,5,6,7,8,9,10-decahydro-1-quinolyl,
3-aza-3-bicyclo[4,4,0]decyl or 1,2,3,4,5,6,7,8,9,10-decahydro-2-isoquinolyl,
3-methyl-2-aza-2-bicyclo[4,4,0]decyl,
10-aza-10-bicyclo[4,3,1]decyl or 10-homogranataninyl,
8-aza-8-bicyclo[4,3,1]decyl,
2-aza-2-bicyclo[4,3,1]decyl,
4-aza-4-bicyclo[5,4,0]undecyl or 2,3,4,5,6,7,8,9,10,11-decahydro-1H-3-benzazepinyl,
7-aza-bicyclo[4,3,0]nona-3-en-7-yl or 4,7,8,9-tetrahydro-1-indolinyl,
8-aza-bicyclo[4,3,0]nona-3-en-8-yl or 4,7,8,9-tetrahydro-2-isoindolinyl, 8-aza-bicyclo[4,3,0]non-6(10)-en-8-yl or 4,5,6,7-tetra-hydro-2-isoindolinyl,
3-aza-bicyclo[4,4,0]dec-6(11)-en-3-yl or 1,2,3,4,5,6,7,8-octahydro-2-isoquinolyl or 9-aza-bicyclo[4,2,1]nona-2,4-dien-9-yl
residues, as well as
2,5-diaza-5-methyl-2-bicyclo[2,2,0]hexyl,
3,5-diaza-3-bicyclo[3,2,2]nonyl,
2,5-diaza-2-bicyclo[3,2,2]nonyl or 3,7-diaza-7-methyl-3-bicyclo[3,3,1]nonyl or 7-methyl-3-bispidinyl
residues.

The salts described herein are preferably pharmacologically useful acid addition salts.

The new compounds exhibit valuable pharmacological properties. In addition to morphine atagonism, antimescaline effects and inhibition of polysynaptic reflexes, they primarily show antitussive properties, as can be demonstrated with experimental animals such as cats and pigeons. Thus, the new compounds are useful pharmacologically primarily as antitussives. Furthermore, they can be used as intermediate for the preparation of other useful products.

Particularly valuable in view of their pharmacological, particularly antitussive effects are compounds having one of the formulae

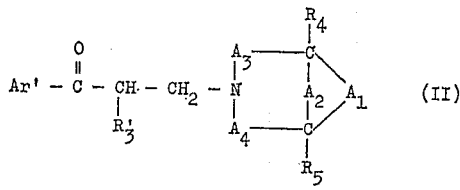

and

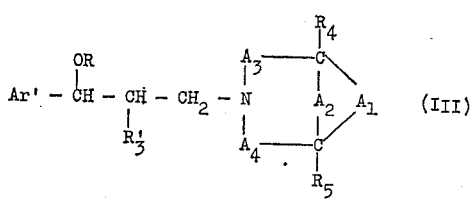

wherein Ar' is a phenyl or pyridyl residue which may be optionally substituted by lower alkyl, lower alkoxy, lower alkenyloxy, amino-lower alkoxy or trifluoromethyl groups or halogen atoms, especially by aryl-lower alkoxy, such as phenyl-lower alkoxy, primarily by benzyloxy groups, substituents having an aromatic portion being optionally substituted in the latter, for example, by lower alkyl, lower alkoxy, lower alkenyloxy or trifluoromethyl groups or halogen atoms, R represents a hydrogen atom or a lower alkyl radical, $R_3'$ is a lower alkyl radical, $A_1$ denotes an alkylene residue containing 1 to 5, especially 2 carbon atoms, as well as an alkenylene residue with 2 to 5 carbon atoms, $A_2$ represents a direct bond or an alkylene chain containing 1 to 3, especially 2 carbon atoms, and each of $A_3$ and $A_4$ stands for a direct bond or an alkylene group having 1-4, especially 1, carbon atoms, with the proviso that the azacyclic portion of the N-azabicycloalkyl residue has 5 to 7 ring members, and with the further proviso that the N-azabicycloalkyl group has 6 to 10 carbon atoms, preferably 7–8 carbon atoms, as ring and bridge members, and each of the groups $R_4$ and $R_5$ represents hydrogen or lower alkyl, as well as their salts, especially their pharmacologically useful acid addition salts.

Especially valuable in view of their outstanding pharmacological, particularly antitussive properties are compounds of the formula

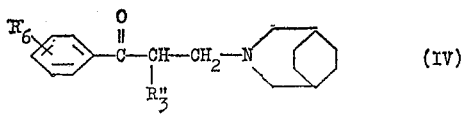

wherein $R_6$ is hydrogen, lower alkyl, lower alkoxy, halogeno, e.g. fluoro, chloro or bromo, or above all aryl-lower alkoxy, such as phenyl-lower alkoxy, especially benzyloxy, these radicals being optionally substituted in the aromatic portion by lower alkyl, lower alkoxy or halogen atoms, and $R_3''$ is lower alkyl, especially methyl, as well as ethyl.

Of particular interest due to their antitussive activity as determined by pharmacological tests on cats and pigeons are the 3-[3-(4-benzyloxy-phenyl)-2-methyl-3-oxo-propyl]-3-aza-bicyclo[3,2,2]nonane, the 3-[3-(2-benzyloxy - phenyl)-2-methyl-3-oxo-propyl]-3-azabicyclo[3,2,2] nonane, and the 3-[3-(4-benzyloxy-phenyl)-2-ethyl-3-oxo-propyl]-3-azabicyclo[3,2,2]nonane, as well as their salts, particularly their pharmaceutically useful acid addition salts; when given intravenously at doses of about 0.001 to about 0.006 g./kg., these compounds produce outstanding antitussive effect. Furthermore, the 3-[3-(4-benzyloxy-phenyl) - 2 - methyl - 3 - oxo-propyl]-3-azabicyclo[3,2,2] nonane, for example, in form of its pharmaceutically acceptable acid addition salts, for example, when given intravenously or subcutaneously to mice or rabbits at doses of about 0.002 to about 0.02 g./kg. antagonizes morphine-induced analgesia and respiratory depression.

The compounds of the present invention are obtained by methods which are in themselves known, for example, by (a) Reacting a compound of formula

with formaldehyde and a compound of the formula H—Het or a primary monocyclic alkylamine permitting the formation of the group Het, or (b) Reacting a reactive ester of a compound of formula

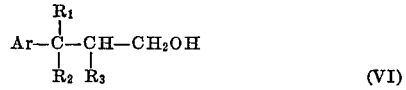

with a compound of the formula H—Het or with a primary monocyclic alkylamine permitting the formation of the group Het, or (c) reacting an organometallic reagent containing a residue of the formula Ar— with a reactive derivative of an acid of the formula

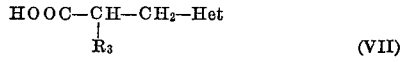

or with a carbonyl compound of the formula

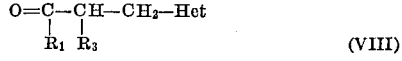

or (d) reacting a reactive derivative of an acid of the formula $$Ar—COOH \qquad (IX)$$

or a carbonyl compound of the formula

with an organometallic reagent containing a residue of the formula

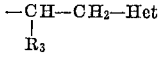

or (e) converting in a compound of formula

the thiocarbonyl group into a methylene or an oxo group, or (f) reducing in a compound having one of the formulae

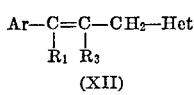   and   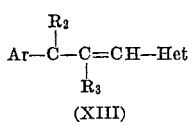

(XII)                              (XIII)

the olefinic C=C-double bond, or (g) reacting a compound of the formula

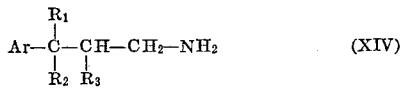   (XIV)

with a monocyclic alkanol or a reactive esterified ester thereof, which, together with the amino group, permits the formation of the N-aza-bicycloalkyl residue Het, or with an oxabicycloalkane capable of furnishing upon reaction with the amine of the Formula XIV the N-azabicycloalkyl radical Het, or (h) replacing in a compound of the formula

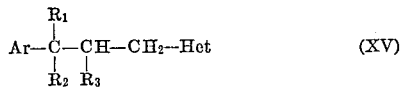   (XV)

wherein at least one of the carbon atoms in the α-position to the aza-nitrogen atom of the group Het carries an oxo or thiono group, the oxo or thiono group by two hydrogen atoms, and, if necessary, converting in a resulting compound containing a residue capable of forming the group Het, such residue into the latter, and, if desired, converting in a resulting compound having an oxo group, such group into a hydroxy group, and/or, if desired, converting in a resulting compound having a hydroxy group, such group into an oxo group or into a functionally converted hydroxy group, and/or splitting it off together with a hydrogen atom and reducing the resulting C=C-double bond.

The reaction (a) is carried out in accordance with the Mannich reaction, optionally in the presence of an acid, such as a mineral acid, e.g. hydrochloric acid. Formaldehyde may be used in the form of a formaldehyde-furnishing reagent, such as a polymerization product, e.g. paraformaldehyde or trioxymethylene, whereas a compound of the formula H—Het or an amine capable of forming the group Het is preferably used in the form of an acid addition salt.

A reactive ester is primarily an ester with an inorganic acid, especially a hydrohalic, e.g. hydrochloric, hydrobromic or hydriodic acid, as well as sulphuric acid, or with a strong organic acid, especially a strong organic sulfonic acid, e.g. methanesulfonic, ethanesulfonic, p-toluene-sulfonic, p-bromobenzenesulfonic, p- or m-nitrobenzenesulfonic acid. The reaction of such a reactive ester with H—Het or the amine compound as shown in process modifications (b) is carried out according to per se known methods, using primarily starting materials of the Formula VI, in which $R_2$ stands for hydrogen, if desired, while working in the presence of an excess of the amine reagent or of an additional base for neutralizing any acid liberated during the reaction or of a salt-forming reagent capable of forming, for example, an alkali metal, e.g. sodium salt of the amine compound, whereby salt-formation may also take place during the reaction.

The amine compounds used in process modifications (a) or (b) and capable of forming the group Het, are primarily monocycloalkylenediamines, but may also denote the corresponding monocycloalkyleneamino-hydroxy compounds, particularly reactive esters thereof. The diamines and ester derivatives of the corresponding aminoalcohols on reaction with reactive esters of compounds of Formula VI usually directly lead to the desired compounds of Formula I, whereas, when using a corresponding aminoalcohol, a hydroxyamino intermediate product may be obtained, which may also be formed in the process modification (a) upon reaction of a starting material of the Formula V with a monocycloalkyleneaminohydroxy compound in the presence of formaldehyde. The intermediate may subsequently be converted to the desired compound, for example, by elimination of water or by forming a reactive ester and eliminating an acid.

Reactive derivatives of acids suitable for reaction with organometallic derivatives are primarily acid halides, such as chlorides, or the corresponding nitriles, as well as amides. Nitriles, i.e. compounds of formulae

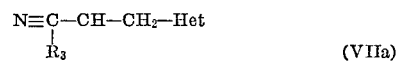   (VIIa)

or

   (IXa)

as well as corresponding amides, may primarily be converted to the desired ketones by treatment with magnesium Grignard derivatives, i.e. compounds of the formulae

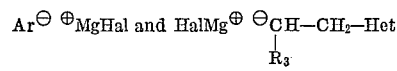

respectively, in which Hal represents a halogen, e.g. chlorine, bromine or iodine atom. Acid halides, i.e. compounds of formulae

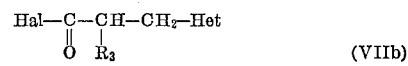   (VIIb)

or

   (IXb)

may be reacted to form the ketones with the above magnesium Grignard reagents, as well as with the corresponding zinc Grignard compounds, but especially with the cadmium compounds, for example, of formula $[Ar]_2Cd$. Furthermore, lithium salts as reactive derivatives of acids, may also be treated with lithium derivatives containing the abovementioned residues, so as to obtain the desired ketones.

The conversion of a thiocarbonyl group to an oxo or a methylene group is carried out by methods known in themselves; into an oxo group, for example, by treating the starting material with a suitable base, such as an alkali metal hydroxide, e.g. sodium hydroxide (preferably in the presence of a lower alkanol, e.g. ethanol) or with a suitable acid, e.g. sulfuric acid; into a methylene group, for example, by treatment with a suitable hydrogenation catalyst, such as Raney nickel, if desired, in the presence of hydrogen, and, preferably, of an alkanol, e.g. methanol or ethanol.

The reduction of the olefinic carbon-to-carbon double bond in the starting materials of the Formulae XII and XIII is carried out, for example, with the help of catalytically activated hydrogen in the presence of a hydrogenation catalyst, e.g. platinum oxide. At the same time substituents which may be simultaneously reduced, e.g. an oxo group, may also be reduced, e.g. to a hydroxyl group.

A monocyclic alkanol used in modification (g) is primarily a monocycloalkylenediol, which, if desired, in the form of a reactive diester, together with the amino group of the starting material of the Formula XIV leads to the formation of the group Het. If one uses, for example, the monoester of a monocycloalkylenediol, it is possible that a hydroxyamino compound as an intermediate product is formed, which may be converted to the desired compound in the manner described above.

The reaction of an amine of the Formula XIV with an oxabicycloalkane is carried out according to known methods, e.g. by heating together a mixture of the two reaction components in the presence or absence of a suitable solvent and/or condensing agent.

The reduction of an oxo or thiono group in a compound of the Formula XV, wherein at least one of the carbon atoms in the α-position to the azo-nitrogen atom of the residue Het carries an oxo or thiono group, is carried out with a reducing reagent, especially a complex metal hydride, such as a suitable light metal hydride, e.g. lithium aluminium hydride, or with hydrogen in the presence of a suitable catalyst, such as a copper-chromium catalyst, (for the oxo group), as well as, for example, by treatment with a hydrogenation catalyst, such as Raney nickel, if desired, in the presence of hydrogen and/or of a lower alkanol (for the thiono group). At the same time, groups which may be simultaneously reduced, such as, for example, an oxo group, may also be reduced, for example, converted to a hydroxy group.

In a compound obtainable according to the above process, the conversion of carbonyl group representing the grouping $—(R_1)(R_2)C—$ to the carbinol group is carried out according to known methods. The oxo group is preferably reduced, for example, by treatment with nascent hydrogen, such as with a metal in the presence of a hydrogen-releasing material, e.g. with sodium in an alcohol, such as a lower alkanol, or with a complex metal hydride, e.g. sodium borohydride, or with hydrogen in the presence of a hydrogenation catalyst, for example, a platinum, palladium, rhodium, nickel or copper catalyst, e.g. platinum oxide, palladium black, Raney nickel or copper, chromite or rhodium, on a carrier, e.g. aluminium oxide or charcoal. The reduction is preferably carried out in the presence of diluents and/or solvents, while cooling, at room or at an elevated temperature, in an open vessel or in a closed vessel under pressure. The reduction of the oxo group may also be carried out by the Meerwein-Ponndorf-Verley method, in the usual manner, for example, by treatment with a lower alkanol, such as isopropanol, in the presence of a corresponding alkanolate, such as aluminium isopropylate.

The reduction of the oxo group may also be carried out with simultaneous introduction of an aliphatic or aromatic residue, for example, by treating a resulting compound, in which the grouping $—(R_1)(R_2)C—$ represents a carbonyl group, with an organometallic reagent capable of introducing an aliphatic or aromatic residue, for example, with a reagent analogous to the abovementioned organo-metallic compounds, especially with an appropriate magnesium halide Grignard reagent.

In resulting compounds, a carbinol group

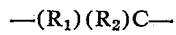

may, if desired, be converted to an carbonyl group in a manner which is in itself known, e.g. by treatment with a suitable oxidising agent, such as a chromium-VI compound. Furthermore, a free hydroxyl group may in the usual manner be converted into a functionally converted, for example, etherified or esterified hydroxyl group. Etherification may, for example, be carried out by treatment with a diazo compound, such as a diazo-lower alkane, e.g. diazomethane or diazoethane, optionally in the presence of a suitable Lewis acid, such as fluoboric acid, aluminium chloride, boron trifluorideetherate or an aluminium lower alkanolate. However, it is also possible to produce a metal, such as an alkali metal, e.g. sodium salt and react it with a reactive ester of an alcohol; alternatively, the hydroxy group can be reactively esterified for example, by replacing it by a halogen atom (e.g. by treatment with a thionyl halide, e.g. thionyl chloride), or converting it to a sulfonyloxy group (e.g. by treatment with an organic sulfonic acid halide, e.g. chloride), and may then be reacted with an alcohol, preferably in the form of a metal, such as an alkali metal, e.g. sodium salt thereof. Esterification is preferably carried out by treatment with acid halides, e.g. chlorides, acid anhydrides or ketenes, optionally in the presence of condensation agents, such as bases for binding the acid which may be produced.

A free hydroxy group may be removed by dehydration, for example, at an elevated temperature or by treatment with an acid, an esterified hydroxy group by splitting off an acid, for example, by treatment with a base, with the formation of a double bond; the latter may be reduced as indicated above.

The reactions of the process are carried out in the usual manner, while cooling, at room temperature or at an elevated temperature, in an open or closed vessel, optionally under pressure, in the presence or absence of solvents or diluents and/or catalysts and/or condensation agents, and/or in an inert gas atmosphere such as a nitrogen atmosphere.

Depending on the reaction conditions the new compounds are obtained in the free form or in the form of their salts.

Salts of compounds of the present invention are acid addition salts, especially pharmaceutically useful non-toxic acid addition salts, such as those with inorganic acids, for example, hydrochloric, hydrobromic, nitric, sulphuric or phosphoric acid, or with organic, such as organic carboxylic acids, for example, acetic, propionic, glycollic, malonic, succinic, maleic, hydroxymaleic, methylmaleic, fumaric, malic, tartaric, citric, benzoic, cinnamic, mandelic, salicylic, 4-aminosalicylic, 2-phenoxybenzoic, 2-acetoxybenzoic, embonic, nicotinic or isonicotinic acid, or organic sulfonic acids, for example, methanesulfonic, ethanesulfonic, 2 - hydroxy - ethanesulfonic, ethane-1,2-disulfonic, benzenesulfonic, p-toluene-sulfonic, naphthalene-2-sulfonic or cyclohexanesulfamic acid, as well as ascorbic acid. Salts with these acids, as well as other acid addition salts, may furthermore be used as intermediates, for example, for purifying the free compounds or in the manufacture of other salts, but also for identification purposes. Salts which are especially suitable for identification purposes are, for example, those with picric, picrolonic, flavianic, tungstic, phosphomolybdic, chloroplatinic, Reinecke or perchloric acid.

The salts obtained may be converted to the free bases in ways which are in themselves known, such as treatment with a base, e.g. a metal hydroxide, for example, lithium, sodium or potassium hydroxide or calcium hydroxide, with a metal carbonate, for example, sodium potassium or calcium carbonate or hydrogen carbonate, or with ammonia, as well as with a suitable hydroxyl ion exchange preparation.

Salts obtained may be converted to other salts in ways which are in themselves known, for example, by treating a salt of an inorganic acid with a suitable metal salt, such as a sodium, barium or silver salt of an acid, in a suitable solvent in which the resulting new salt is insoluble and, therefore, precipitates from the reaction mixture, or by treatment with an ion exchange preparation.

Free bases obtained may be converted to their acid addition salts in ways which are in themselves known, for example, by reaction with acids, such as the acids quoted above, for example, by treating a solution of a base in a suitable inert solvent or solvent mixture with an acid or with a solution of an acid, or with a suitable anion exchange preparation.

The compounds, including their salts, may be obtained in the form of their hydrates or may include the solvent used for the crystallization.

In view of the close relationship between the new compounds in their free form and in the form of their salts, the free compounds or their salts are in this context and whenever this is appropriate, to be understood as also representing the corresponding salts and free compounds, respectively.

Resulting isomer mixtures may, in a manner which is in itself known, be converted to the individual isomers; preferably the isomer with the greater pharmacological activity is isolated. Racemates may be resolved into the optically active d- and l-forms, for example, by crystallization from optically active solvents. By treating racemic compounds, preferably in the presence of a suitable solvent, with optically active acids, the diastereoisomeric salts may be formed; optically active forms of tartaric, malic, mandelic, camphor-10-sulphonic or quinic acid are particularly suitable for this purpose. Mixtures of resulting diastereoisomeric salts may then be separated into the isomers, for example, by fractional crystallization, and, if desired, the individual salts may be converted into the free and optically active bases, and these into an acid addition salt by the methods described above.

The invention also relates to those embodiments of the process, wherein a compound obtainable as an intermediate product at any desired stage of the process is used as the starting material and the missing process stages are carried out with it, or in which a starting substance is formed under the conditions of the reaction or is used in the form of a derivative, such as a salt thereof. In the process of the present invention such starting substances are preferably used as lead to the compounds described initially as being particularly valuable.

The starting materials are known or are obtained in a manner which is in itself known.

For example, oxo compounds may be converted to corresponding thiono derivatives of the Formula XI using conventional methods, e.g. reaction with phosphorus pentasulfide in a suitable solvent.

Compounds of the Formula XIII used in variant (f) may be prepared, for example, by reaction of a compound of the formula

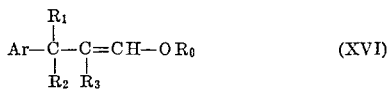

wherein $R_0$ is a hydrogen atom or a lower alkyl group with a compound of the formula H—Het; the starting material of the Formula XVI itself may be formed, for example, by the reaction of a compound of the formula

wherein $R_1$ and $R_2$ together are an oxo group, with a lower alkyl formate or a tri-lower alkyl orthoformate, e.g. methyl formate or triethyl orthoformate.

Compounds of the Formula XIV are, for example, obtained from the corresponding reactive esters of compounds of Formula VI by treatment with ammonia or an ammonia-furnishing reagent, whereas the nitrile compounds of Formula VIIa may be formed, for example, from compounds of the formula H—Het, by treatment with a halogeno-alkanonitrile of Formula $$N{\equiv}C{-}CH(R_3){-}CH_2{-}Hal \qquad (XVIII)$$

preferably in the presence of a base, or with an alkenonitrile of the formula $$N{\equiv}C{-}C(R_3){=}CH_2 \qquad (XIX)$$

Organometallic reagents are produced in a manner which is in itself known, preferably in the presence of suitable solvents, such as ether, tetrahydrofuran, benzene and similar solvents, if necessary, by using reagents which initiate and/or assist the reaction.

Oxabicycloalkane compounds used in modification (g) may be prepared, for example, from a monocyclic alkane diol by dehydration in the presence of a suitable dehydrating agent like sulfuric acid; thus, the 3-oxa-bicyclo[3,2,2] nonane may be prepared from 1,4-bis-(hydroxymethyl)-cyclohexane.

Compounds of the Formula XV, wherein at least one of the α-carbon atoms carries an oxo group, are prepared by conventional methods, for example, by reacting a reactive ester or a halide of the acid

with the compound H-Het, if desired, in the presence of a suitable acid binding agent.

The compounds of the present invention may be used as medicaments, for example, in the form of pharmaceutical preparations, which contain such compounds together with pharmaceutically acceptable, organic or inorganic, solid or liquid excipients which are suitable for enteral, for example, oral, or parenteral administration. These preparations may, for example, be in the solid form, for example, as tablets, dragées or capsules, or in liquid form, for example, as solutions, suspensions or emulsions. They may contain auxiliary substances, such as preservatives, stabilizers, wetting agents or emulsifiers, salts for controlling the osmotic pressure, buffers, dyestuffs or flavouring substances. The pharmaceutical preparations, which may be formulated by methods which are in themselves known, may also contain other therapeutically valuable substances.

The invention is described in more detail in the following examples. Temperatures are given in degrees centigrade.

EXAMPLE 1

A mixture of 7.2 g. of p-benzyloxypropiophenone and 2.7 g. of paraformaldehyde in 70 ml. of ethanol is treated with 4.86 g. of 3-azabicyclo[3,2,2]nonane hydrochloride and 10 drops of concentrated hydrochloric acid and heated under reflux for 16 hours. On cooling, the hydrochloride of 3-[3-(4-benzyloxyphenyl)-2-methyl-3-oxo-propyl]-3-azabicyclo[3,2,2]nonane of the formula

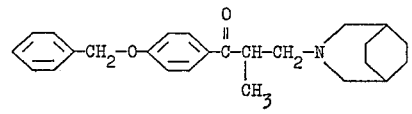

crystallizes; it melts at 188° after recrystallization from a mixture of methanol, isopropanol and ether. By treatment with a base, the free 3-[3-(4-benzyloxyphenyl)-2-methyl - 3 - oxo-propyl]-3-azabicyclo[3,2,2]nonane is obtained.

EXAMPLE 2

A mixture of 4.56 g. of p-fluoropropiophenone and 2.7 g. of paraformaldehyde in 60 ml. of ethanol is treated with 4.86 g. of 3-azabicyclo[3,2,2]nonane hydrochloride and 10 drops of concentrated hydrochloric acid and heated under reflux for 16 hours. On cooling, the hydrochloride of 3 - [3 - (4-fluorophenyl)-2-methyl-3-oxo-propyl]-3-azabicyclo[3,2,2]nonane of the formula

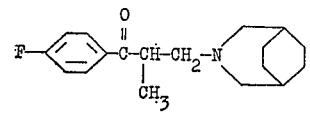

crystallizes; it melts at 180–182° after recrystallization from a mixture of isopropanol and ether.

Similarly, the 3 - [3 - (4 - bromophenyl)-2-ethyl-3-oxo-propyl] - 3 - azabicyclo[3,2,2]nonane, the hydrochloride of which melts at 195° after recrystallization from a mixture of methanol and isopropanol, and the 3-[2-ethyl-3 - (4 - fluorophenyl) - 3 - oxo-propyl]-3-azabicyclo-[3,2,2]nonane, the hydrochloride of which melts at 183° after recrystallization from isopropanol, are prepared from appropriate starting materials.

EXAMPLE 3

A mixture of 4.97 g. of p-chloropropiophenone and 2.7 g. of paraformaldehyde in 60 ml. of ethanol is treated with 4.86 g. of 3-azabicyclo[3,2,2]nonane hydrochloride and 10 drops of concentrated hydrochloric acid and heated under reflux for 16 hours. On cooling, the hydrochloride of 3 - [3 - (4 - chlorophenyl) - 2 - methyl - 3-oxo-propyl-3-azabicyclo[3,2,2]nonane of the formula

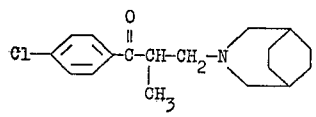

crystallizes; it melts at 183–185° after recrystallization from isopropanol.

EXAMPLE 4

A mixture of 7.2 g. of o-benzyloxy-propiophenone and 2.7 g. of paraformaldehyde on 70 ml. of ethanol is treated with 4.86 g. of 3-azabicyclo[3,2,2]nonane hydrochloride and 10 drops of concentrated hydrochloric acid and heated under reflux for 16 hours. On cooling, a small quantity of crystalline substance appears, which is filtered off. The filtrate is evaporated to dryness, the residue is dissolved in 100 ml. of water and basified with an aqueous solution of 2 N sodium hydroxide. The liberated base is extracted with ethyl acetate, dried over anhydrous sodium sulphate and evaporated to dryness. The residue is dissolved in ether and treated with an ether solution of maleic acid to yield as crystalline precipitate the maleate of 3-[3-(2-benzyloxy-phenyl)-2-methyl-3-oxo-propyl]-3-azabicyclo[3,2,2]nonane of the formula

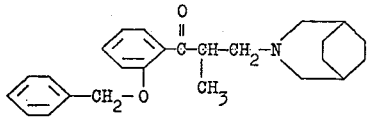

which melts at 128–130° after recrystallization from a mixture of methanol, isopropanol and ether.

EXAMPLE 5

A mixture of 9.3 g. of ethyl 3-pyridyl ketone monohydrochloride and 5.4 g. of paraformaldehyde in 125 ml. of ethanol is treated with 9.7 g. of 3-azabicyclo[3,2,2]nonane hydrochloride and 10 drops of concentrated hydrochloric acid and heated under reflux for 16 hours. On cooling, the dihydrochloride of 3-[2-methyl-3-oxo-3-(3-pyridyl)-propyl]-3-azabicyclo[3,2,2]nonane of the formula

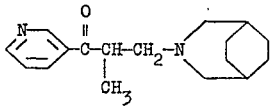

crystallizes; it melts as the hemihydrate at 160° (with decomposition) after recrystallization from a mixture of isopropanol and ether.

EXAMPLE 6

20 g. of 3-[3-(4-benzyloxyphenyl)-2-methyl-3-oxo-propyl]-3-azabicyclo[3,2,2]nonane hydrochloride and 130 g. of corn starch are intimately mixed and treated with a paste made of 30 g. of maize starch and 100 g. of distilled water. The mass is thoroughly kneaded, granulated and dried at 45°. A mixture of 14 g. of talc and 6 g. of magnesium stearate is added to the granules and the mixture thoroughly mixed and then converted to tablets which each contain 0.01 g. or 0.05 g. of the active substance.

EXAMPLE 7

A mixture of 9 g. of p-fluorovalerophenone and 4.5 g. paraformaldehyde in 110 ml. of ethanol is treated with 8.1 g. of 3-azabicyclo[3,2,2]nonane hydrochloride and 10 drops of concentrated hydrochloric acid and heated under reflux for 16 hours. On cooling, the hydrochloride of 3-[3-(4-fluorophenyl)-2-n-propyl-3-oxo-propyl]-3-azabicyclo[3.2,2]nonane of the formula

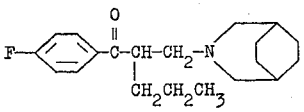

crystallizes; it melts at 192° after recrystallization from a mixture of isopropanol and ether.

EXAMPLE 8

A solution of 3 g. of 3-[3-(4-benzyloxyphenyl)-2-methyl-3-oxo-propyl]-3-azabicyclo[3,2,2]nonane in 100 ml. dry ether is treated with a solution of 1.2 g. maleic acid in 110 ml. of ether. A white crystalline precipitate is formed, which is filtered and recrystallized from a mixture of methanol, isopropanol and ether to afford the maleate of 3-[3-(4-benzyloxy-phenyl)-2-methyl-3-oxo-propyl]-3-azabicyclo[3,2,2]nonane, which melts at 160–162°.

EXAMPLE 9

A solution of 7.56 g. of 4-benzyloxy-butyrophenone in 80 ml. of absolute ethanol is treated with 2.7 g. of paraformaldehyde and 4.96 g. of 3-azabicyclo[3,2,2]nonane hydrochloride and 10 drops of concentrated hydrochloric acid and heated under reflux for 24 hours. On cooling, the hydrochloride of 3-[3-(4-benzyloxy-phenyl)-2-ethyl-3-oxo-propyl]-3-azabicyclo[3,2,2]nonane of the formula

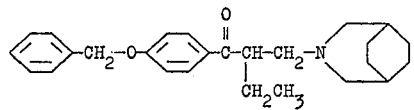

crystallizes; it melts at 198–199° after recrystallization from a mixture of isopropanol and ether.

The starting material is prepared as follows:

To a solution of 32.8 g. of p-hydroxy-butyrophenone in 400 ml. toluene is added portionwise under anhydrous conditions 10 g. of 50% dispersion of sodium hydride in mineral oil. The reaction mixture is boiled under reflux while stirring for 2 hours and cooled to room temperature, then treated dropwise with 34.2 g. of benzylbromide; the mixture is boiled under reflux for 24 hours and filtered to remove inorganic material, and the filtrate is washed with 50 ml. of a 10% aqueous sodium hydroxide solution and 25 ml. water, dried and evaporated to dryness. The residue is crystallized from isopropanol to afford 4-benzyloxy-butyrophenone, M.P. 63–65°.

EXAMPLE 10

A mixture of 7.74 g. of p-(4-fluoro-benzyloxy)-propiophenone and 2.7 g. of paraformaldehyde in 80 ml. of absolute ethanol is treated with 4.86 g. of 3-azabicyclo[3,2,2]nonane hydrochloride and 10 drops of concentrated hydrochloric acid and heated under reflux for 16 hours. On cooling, the hydrochloride of 3-{3-[4-(4-fluoro-benzyloxy)-phenyl]-2-methyl-3-oxo-propyl}-3-azabicyclo[3,2,2]nonane of the formula

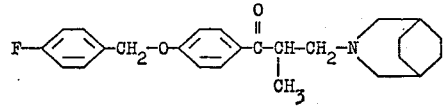

crystallizes; it melts as the hemihydrate at 188–190° after recrystallization from a mixture of methanol, isopropanol and ether.

The starting material is prepared as follows:

To a solution of 30 g. of p-hydroxy-propiophenone in 400 ml. toluene is added portionwise under anhydrous conditions 10 g. of 50% dispersion of sodium hydride in mineral oil. The reaction mixture is boiled under reflux with stirring for 2 hours, cooled to room temperature and then treated dropwise with 40 g. of 4-fluoro-benzyl chloride. The mixture is refluxed for 48 hours, cooled to room temperature and filtered and the filtrate is washed with 50 ml. of a 10% aqueous solution of sodium hydroxide and with 25 ml. water, dried over anhydrous sodium sulphate and evaporated to dryness. The residue is crystallized from isopropanol to afford the p-(4-fluoro-benzyloxy)-propiophenone, M.P. 80–81°.

EXAMPLE 11

A solution of 10 g. of 3-[3-(4-benzyloxy-phenyl)-2-methyl-3-oxo-propyl]-3-azabicyclo[3,2,2]nonane in 300 ml. methanol is treated with 1 g. of sodium borohydride in 50 ml. of 50% aqueous methanol and refluxed for 12 hours. The mixture is evaporated to dryness, the residue is taken into ethyl acetate, the organic solution is dried and again evaporated to dryness. The residue is taken into isopropanol and treated with an excess of maleic acid in ether. The crystalline precipitate is recrystallized from a mixture of methanol and ether to afford the maleate of 3-[3-(4-benzyloxy-phenyl)-3-hydroxy - 2 - methyl - propyl]-3-azabicyclo[3,2,2]nonane of the formula

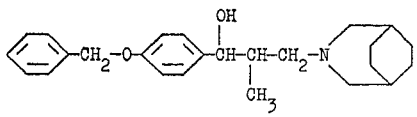

which melts at 163–165°.

EXAMPLE 12

A mixture of 7.42 g. of p-(2-dimethylaminoethoxy)-propiophenone hydrochloride and 2.25 g. of paraformaldehyde in 70 ml. of absolute ethanol is treated with 4.05 g. of 3-azabicyclo[3,2,2]nonane hydrochloride and 10 drops of concentrated hydrochloric acid and heated under reflux for 24 hours. On cooling and addition of 50 ml. ether, the dihydrochloride of 3-{3-[4-(2-dimethylaminoethoxy)-phenyl] - 2 - methyl-3-oxo-propyl}-3-azabicyclo-[3,2,2]nonane of the formula

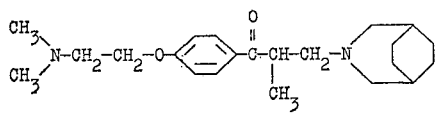

crystallizes out. It is recrystallized from a mixture of isopropanol and ether and melts at the hemihydrate at 199–200°.

The starting material is prepared as follows:

A solution of 30 g. of p-hydroxy-propiophenone in 400 ml. of dry toluene is treated with 20.8 g. of a 50% dispersion of sodium hydride in mineral oil; the mixture is boiled under reflux for 2 hours and cooled to room temperature, then treated with 28.8 g. of 2-dimethylaminoethyl chloride hydrochloride. The reaction mixture is boiled under reflux for 16 hours, the inorganic material is filtered off and the filtrate is evaporated to dryness. The residue is dissolved in 100 ml. of isopropanol and treated with 23.2 g. of maleic acid in 100 ml. of isopropanol. A crystalline precipitate is formed which is filtered off and recrystallized from a mixture of methanol and isopropanol to afford the p-(2-dimethylaminoethoxy)-propiophenone maleate, M.P. 132°.

This salt is dissolved in water and basified with aqueous ammonium hydroxide, the liberated base is extracted with ethyl acetate, the organic solution is dried over anhydrous sodium sulphate and evaporated to dryness. The residue is dissolved in isopropanol and treated with a solution of hydrogen chloride in isopropanol to afford a hygroscopic hydrochloride.

I claim:

1. A compound selected from the group consisting of a compound of the formula

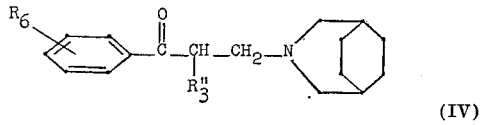

in which $R_6$ is phenyl-lower alkoxy or phenyl-lower alkoxy substituted on the phenyl ring by a member selected from the group consisting of lower alkyl, lower alkoxy, nitro, amino, trifluoromethyl and halogen, and $R_3''$ is lower alkyl, and pharmaceutically acceptable acid addition salts thereof.

2. A compound as claimed in claim 1 and being a member selected from the group consisting of a compound of the Formula IV as shown in claim 1, wherein $R_6$ stands for phenyl-lower alkoxy and $R_3''$ is lower alkyl, and pharmaceutically acceptable acid addition salts thereof.

3. A compound as claimed in claim 1 and being a member selected from the group consisting of a compound of the Formula IV as shown in claim 1, wherein $R_6$ stands for benzyloxy and $R_3''$ is lower alkyl, and pharmaceutically acceptable acid addition salts thereof.

4. A compound as claimed in claim 1 and being a member selected from the group consisting of a compound of the Formula IV as shown in claim 1, wherein $R_6$ stands for benzyloxy and $R_3''$ is methyl, and pharmaceutically acceptable acid addition salts thereof.

5. A compound as claimed in claim 1 and being a member selected from the group consisting of 3-[3-4-benzyloxyphenyl) - 2 - methyl - 3 - oxo - propyl] - 3-azabicyclo[3,2,2]nonane, and pharmaceutically acceptable acid addition salts thereof.

6. A compound as claimed in claim 1 and being a member selected from the group consisting of 3-[3-(2-benzyloxy - phenyl) - 2 - methyl - 3 - oxo - propyl]-3-azabicyclo[3,2,2]nonane, and pharmaceutically acceptable acid addition salts thereof.

7. A compound as claimed in claim 1 and being a member selected from the group consisting of 3-[3-(4-benzyloxy - phenyl) - 2 - ethyl - 3 - oxo - propyl] - 3-azabicyclo[3,2,2]nonane, and pharmaceutically acceptable acid addition salts thereof.

References Cited

UNITED STATES PATENTS 3,318,875  5/1967  Nobles _____ 260—239
3,328,390  6/1967  Grogan _____ 260—239

OTHER REFERENCES

Blanton et al.: J. Pharm. Sci., vol. 52, pages 46–49 (1963).

Blanton et al.: J. Pharm. Sci., vol. 53, pages 521–524 (1964).

ALTON D. ROLLINS, Primary Examiner

U.S. Cl. X.R.

260—239 BB, 247.5 R, 268 BF, 288 R, 294.7 G, 295 S, 295.5 S, 296 R, 326.1, 326.11, 326.5 CA, 340.5; 424—244